United States Patent [19]
Ferrand

[11] 3,841,021
[45] Oct. 15, 1974

[54] CULTIVATION POT FOR SEEDLINGS AND PLANTS

[76] Inventor: Marcel Ferrand, 263 Chemin de Bellet, Nice, France

[22] Filed: Feb. 1, 1972

[21] Appl. No.: 222,612

[30] Foreign Application Priority Data
Feb. 5, 1971 France .............................. 71.5093

[52] U.S. Cl. ...................................... 47/1.2, 47/34
[51] Int. Cl. ............................................. A01g 31/02
[58] Field of Search ..................... 47/34, 38, 1.2, 37

[56] References Cited
UNITED STATES PATENTS

| | | | |
|---|---|---|---|
| 100,300 | 3/1870 | Ludlum.................................. | 47/37 |
| 2,189,982 | 2/1940 | Haglund.............................. | 47/38.1 |
| 2,253,817 | 8/1941 | Simmons............................... | 47/34 |
| 2,833,087 | 5/1958 | Wedding et al......................... | 47/37 |
| 2,968,124 | 1/1961 | Coplen................................... | 47/37 |

FOREIGN PATENTS OR APPLICATIONS

| 403,176 | 12/1933 | Great Britain......................... | 47/34 |
|---|---|---|---|

*Primary Examiner*—Robert E. Bagwill
*Attorney, Agent, or Firm*—William Anthony Drucker

[57] ABSTRACT

The invention provides in combination (i) a cultivation pot for seedlings and plants in the form of a tubular body open at both of its ends and having a reinforcing rib formation adjacent to one of the ends, and (ii) a cup shaped closure having a base and a side wall. The closure is insertable in the other open end of the body in both upright and inverted position, and a capillary space is defined between the wall of the tubular body and the side wall of the closure.

2 Claims, 7 Drawing Figures

3,841,021

CULTIVATION POT FOR SEEDLINGS AND PLANTS

The subject of the invention is a multi-purpose flower pot.

With existing devices of this kind, the flower pots are either open or closed at the base, or perforated, so that their uses are limited to their particular manufacture. In addition, their predetermined function is not adaptable to the various requirements of cultivation envisaged.

The device forming the subject of the invention overcomes these disadvantages and permits, starting from a standard unit or volume, to use it without modification equally well for cultivation and for decorative purposes in tubs or pots, or for bedding out without removal from the pot, whilst seeding, cultivation, transference and display take place without repotting.

The device consists of an impervious envelope, of tubular shape, and open at its upper and lower parts, but fitted at its base with a removable closure, the attached neck of which forms a capillary space promoting capillary attraction and surface tension phenomena, thus feeding the soil with moistening or nutritive fluid in doses proporationate to the ambient hygrometry or humidity. The upper part has a rim forming a rib around the circumference, providing a handling shoulder. This pot is also shaped like a truncated cone with a widened base to permit development of the roots and stacked storage, while possessing the same advantages and giving the same functional results.

In the accompanying drawing given by way of non-limiting example of one of the forms of construction of the invention:

Figure 1:
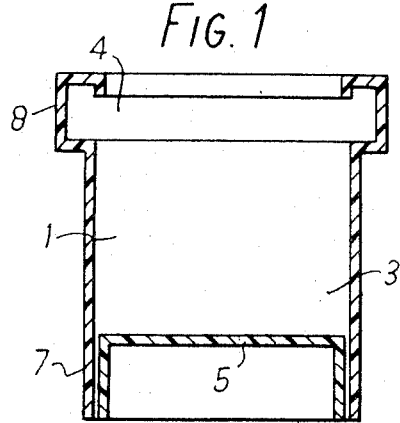
FIGS. 1, 2 show the pots or bowls with their removable base, in the positions in which they are used. This section is cylindrical or conical, with the same utilisation and constructional features.
Figure 2:
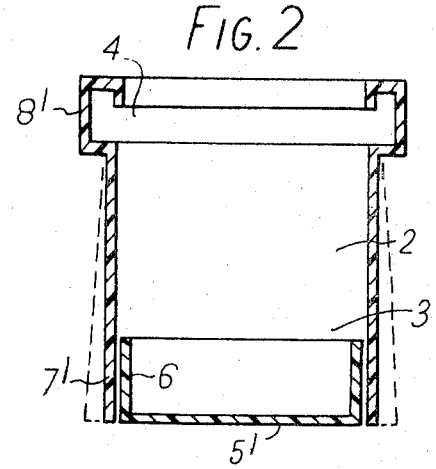

The pots in FIGS. 1, 2 are made up of tubular elements 1, 2 with an open base 3 and an open upper part 4.

The base 3 receives a removable closure 5, of which the walls 6 allow it to be fitted in the positions 5, 5'. The joint 7, 7' forms a capillary space permitting the rise and fall of the water. It is intended to moisten the soil. The upper shoulder 8 is a strengthening rib for the pot and serves both to assist handling of the pot and also as a collar to protect or to receive the product in question, in accordance with its internal and external section, be it concave, convex or re-entrant.

Figure 3:
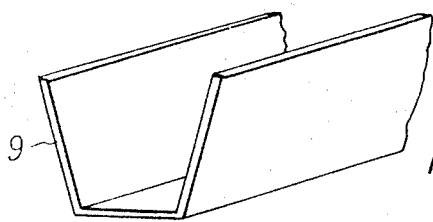
FIGS. 3, 4 show one of the ways of using the bowls for seeds and plant cultivation.
Figure 4:
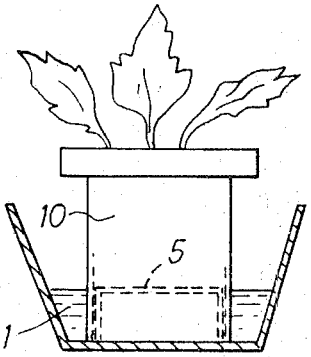
Figure 5:
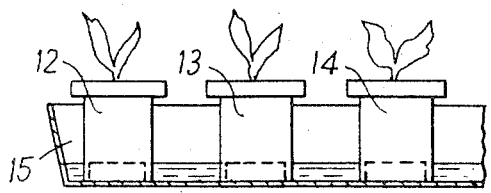
FIGS. 5, 6 show how the bowls are used in decorative tubs.
Figure 6:
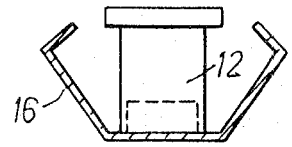
Figure 7:
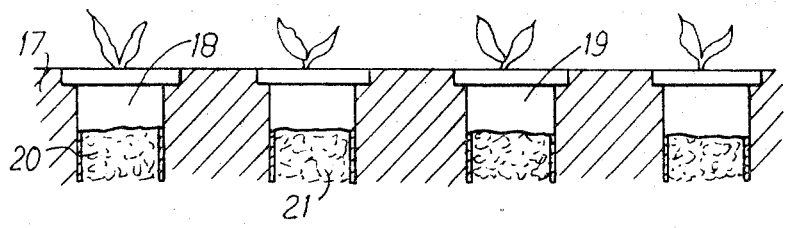
FIG. 7 shows the use of the pots for transplanting seedlings or plants.

FIGS. 3, 4 show the bowl used in troughs 9 which contain the bowl 10, the level 11 of the water reaching the base 5.

For decorative purposes, the pots 12, 13, 14 are placed in tubs or pots 15, 16.

Bedding out 17 of the pots 18, 19, containing the original soil, is done by removing the bottom and leaving the bases 20, 21 open, thus allowing the roots to grow while still drawing their strength from the original soil, and thereby obviating the harmful effects of transplanting.

Finally, as shown in FIGS. 1, 2, the base, when in position 5, can be used for raising and for decoration, and in position 5', it permits an increase in the amount of potting soil, with corresponding advantages.

Bowls with a conical section can be stacked, and widening of the base allows the roots to develop. The bases 5' are also made to fulfil the same functions, with a view to being movable and invertible.

None the less, the shapes, dimensions and arrangement of the various elements can be varied within the limits of equivalence, as can the materials used for their manufacture, without thereby modifying the overall concept of the invention which has been described.

Thus, the tubular element is ribbed in accordance with the applications, the base is water-tight, joined or also ribbed to increase the capillary attraction, and, also, the upper collar of internal, external, vertical or inverted section.

The invention may conveniently be summarised as follows:

The multi-purpose flower pot device is characterised by a tubular surrounding wall, open at top and bottom, and having at its base a removable closure the attached neck of which forms a capillary space promoting the surface tension effects of capillary attraction rising or falling to moisten the soil, while the upper edge is fitted with a circular rib under stress which, according to whether its section is concave, convex, open or closed, serves a variety of purposes; this pot can be used for plant-raising, decorative cultivation in tubs, bowls and pots and for bedding out. The device preferably has a removable closure and capillary space allowing, according to its location, either the promotion of moistening by separating the mass of earth from the level of the moistening or nutritive fluid, or an increase in the volume of the cultivating soil. The upper shoulder may have a stretching effect on the tubular wall, a decorative and utilitarian effect through the receiving collar of the product in question, while the base, being raised, allows growth of the roots in the soil without going beyond the cultivating compost, thus preventing accidents during transplanting.

I claim:

1. A cultivation system for seedlings and plants comprising:
    support means;
    an elongated horizontally disposed trough on said support means, said trough having bottom and side walls to contain water; and
    a plurality of pots arranged and standing upright within said trough, each pot comprising an upright tubular body open at its upper and lower ends, each body having a reinforcing rib formation adjacent its upper end, a removable soil supporting invertable cup shape closure member within the lower end of the tubular body, and a capillary space defined between the wall of the tubular body and the sidewall of the closure member extending around the periphery of said closure member side wall, said tubular body and said closure member resting freely on the bottom of said trough.

2. A system as claimed in claim 1 in which the tubular body is conical and is wider at its lower end.

* * * * *